US009193202B2

(12) United States Patent
Garcia et al.

(10) Patent No.: US 9,193,202 B2

(45) Date of Patent: Nov. 24, 2015

(54) PERFORATED MATERIALS FOR PRINTING

(76) Inventors: Luis Garcia Garcia, Les Roquetes (ES); Sergio Puigardeu Aramendia, Barcelona (ES); M. Isabel Borrell Bayona, Barcelona (ES); Angel Martinez Barambio, Barcelona (ES)

( * ) Notice: Subject to any disclaimer, the term of this patent is extended or adjusted under 35 U.S.C. 154(b) by 0 days.

(21) Appl. No.: 14/388,541

(22) PCT Filed: Apr. 27, 2012

(86) PCT No.: PCT/EP2012/057821

§ 371 (c)(1),
(2), (4) Date: Sep. 26, 2014

(87) PCT Pub. No.: WO2013/159829

PCT Pub. Date: Oct. 31, 2013

(65) Prior Publication Data

US 2015/0130871 A1 May 14, 2015

(51) Int. Cl.

| | |
|---|---|
| ***B41J 2/015*** | (2006.01) |
| ***B32B 3/10*** | (2006.01) |
| ***B41M 5/00*** | (2006.01) |
| ***B41M 3/00*** | (2006.01) |
| ***G09F 21/04*** | (2006.01) |
| ***B41M 5/50*** | (2006.01) |
| *B44F 1/06* | (2006.01) |

(52) U.S. Cl.

CPC ............... *B41M 5/0064* (2013.01); *B41M 3/00* (2013.01); *B41M 5/0047* (2013.01); *B41M 5/508* (2013.01); *G09F 21/048* (2013.01); *B44F 1/06* (2013.01)

(58) Field of Classification Search

CPC .... B41M 5/0047; B41M 5/0064; B41M 5/50; B41M 5/508

USPC .................. 347/20; 358/1.13, 1.18, 450, 538; 428/32.24, 32.26, 32.28, 40.1, 65.2, 428/131

See application file for complete search history.

(56) References Cited

U.S. PATENT DOCUMENTS

| | | | | |
|---|---|---|---|---|
| 5,518,803 A | 5/1996 | Thomas | | |
| 5,830,529 A * | 11/1998 | Ross | B41M 3/12 | 101/211 |
| 6,030,687 A * | 2/2000 | Andriash | B23K 26/08 | 219/121.7 |
| 6,242,076 B1 * | 6/2001 | Andriash | B23K 26/381 | 257/98 |
| 7,081,909 B2 | 7/2006 | Shiraiwa | | |
| 7,955,243 B2 | 6/2011 | Hu | | |
| 2002/0160158 A1 | 10/2002 | Nozawa et al. | | |
| 2008/0264280 A1 | 10/2008 | Baggot et al. | | |
| 2009/0225110 A1 | 9/2009 | Soler et al. | | |

FOREIGN PATENT DOCUMENTS

GB 2088613 A 6/1982

* cited by examiner

*Primary Examiner* — Anh T. N. Vo

(74) *Attorney, Agent, or Firm* — Hewlett-Packard Patent Department

(57) ABSTRACT

Print media products comprise a top layer of a printing material comprising a plurality of holes distributed on the surface area thereof, and a bottom layer of a printing material comprising a plurality of holes distributed on the surface area thereof, the top layer being overlayed on and removably attached to the bottom layer such that an ink-receiving side of the top layer is exposed and an ink-receiving side of the bottom layer is in contact with the top layer, and such that the holes of the top layer are at least in part overlapped with print material of the bottom layer.

15 Claims, 3 Drawing Sheets

PERFORATED MATERIALS FOR PRINTING

Perforated print media are currently used in several applications.

For example, it is known to print images on vinyl print media having round holes or perforations and apply them to windows, for example bus windows, such that light can pass though the holes and the passengers can see through the window, while the holes don't hinder the view of the printed image from outside the bus, due to the distance from which it is viewed. In such print media the open area taken up by the perforations may be for example 40% of the surface area, and the perforations may be round holes with a diameter of about 1.5 mm.

In another example of application, meshes of woven textiles may be printed and used in building wraps: they are lighter than continuous media, and at the same time the holes in the mesh allow the passage of light, and therefore the view of the outside from inside the building, and the passage of air, that prevents the wrap from behaving like a sail.

Some perforated media are provided with a continuous liner: in this case, during printing some of the ink is deposited on the liner through the perforations of the media, and is therefore wasted. When printing on perforated media without a liner, some ink is fired through the holes and falls on the print platen: this also involves waste of ink, and the need to later clean the platen. An ink collector is sometimes provided to keep the print zone clean, but this adds to the cost of the printing apparatus, requires maintenance, and doesn't avoid ink waste.

In print media products according to examples of the present invention, some of the above drawbacks are at least partly solved.

Some non-limiting examples will be described in the following with reference to the appended drawings, in which.

Figure 1:
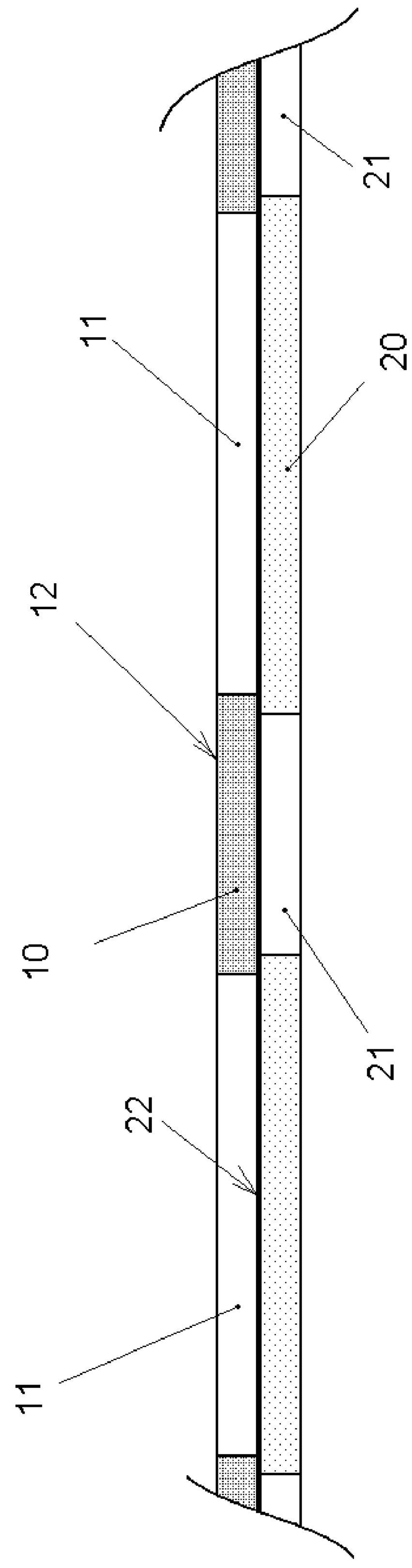
FIG. 1 shows schematically in cross section an example of an enlarged portion of a print media product comprising two layers.

As shown in FIG. 1, print media products may comprise a top layer 10 of a printing material and a bottom layer 20 of a printing material, such that they constitute dual-layer print media products.

The top layer 10 may be of a printing material comprising a plurality of holes or openings 11 distributed on the surface area thereof, at least on the area intended or arranged to be printed: for example, the top layer 10 may be a perforated vinyl film of the kind intended to be printed and applied on a vehicle window, or a mesh of the kind employed for building wraps, or another printing material in which the surface area intended to be printed is not continuous, but has holes or openings. The openings may have different geometrical shapes and sizes.

The bottom layer 20 may also be of a printing material with a plurality of holes or openings 21 distributed on the surface thereof, at least on the area intended or arranged to be printed, for example perforated vinyl film, or a mesh material. It may be the same material of the top layer 10, or a different material. The openings in the two layers may have similar shapes, for example they may be round in both layers, or they may have different shapes, for example round in one layer and rectangular in the other layer. In the same layer there may be openings with different shapes.

The two layers 10 and 20 of FIG. 1 may be overlayed and removably attached to each other. The overlay may be done in such a way that an ink-receiving side 12 of the top layer 10 remains exposed, while an ink-receiving side 22 of the bottom layer 20 remains in contact with the top layer; and such that the holes 11 of the top layer 10 are at least in part overlapped with print material of the bottom layer 20, i.e. passage through at least a portion of the holes 11 of the top layer is obstructed by print material of the bottom layer 20.

In some examples, the two layers 10 and 20 are arranged such that there is no overlap between the holes 11 and 21 in the two layers, such that the holes 11 of the top layer are all closed by print material of the bottom layer 20, while the holes 21 of the bottom layer 20 remain under print material of the top layer 10.

When such print media products are printed, for example in an inkjet printing system arranged to print on the top layer 10, ink falls on the exposed ink-receiving side 12 of the top layer 10 and forms an image thereon; because the holes 11 of the top layer 10 are at least in part overlapped to print material of the bottom layer 20, a proportion of the ink also falls on the ink-receiving side 22 of the bottom layer 20 through the openings or holes 11 of the top layer 10. Thus, the ink will fall on the bottom layer 20 in a plurality of discontinuous patches, matching at least partly the shape and distribution of the holes 11 in the top layer 10. This plurality of patches may form on the bottom layer 20 an image analogous to that on the top layer 10: two printouts are thus formed in the same printing operation. Both printouts show the same image, although the distribution of the ink in the two plots may be different.

Since the two layers are removably attached, after printing the two printouts may be separated, and used as desired. For example, two building wraps, or two films intended to be attached to windows and to allow see-through, may be produced at the same time.

Ink that would be lost through the holes of the top layer is employed to print another plot on the bottom layer, and thus ink waste is reduced. Even in print media products wherein there may be a certain overlap between the holes of the top and bottom layers, there is less waste with respect to perforated print media with a liner or without a liner, in which all the ink that falls through the perforations is wasted.

The open area of the top layer, i.e. the area occupied by the holes 11, may take up at least 45% of the surface area of the top layer 10, for example between 48% and 60% of the surface area.

The image on the top layer and the image on the bottom layer may thus have similar densities and qualities, because about half of the ink forms the image on the top layer and about half of the ink passes though the plurality of holes 11 and forms the image on the bottom layer.

The bottom layer 20 may have an open area that is a smaller proportion of the total surface area with respect to the top layer 10, as this may make it easier to avoid overlap between the openings of the top layer and bottom layer.

The top layer and bottom layer may be removably attached in any suitable way that allows them to be separated after printing; for example, they may be attached by means of a suitable removable adhesive.

Figure 2:
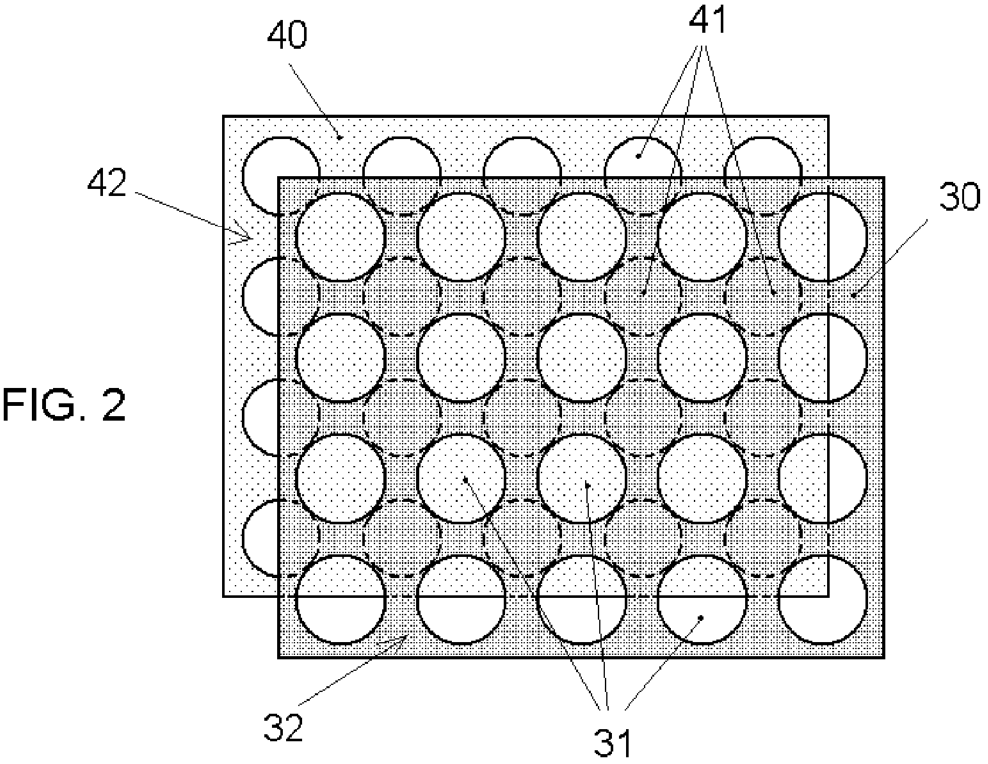
FIG. 2 shows schematically in top view another example of an enlarged portion of a print media product comprising two layers.

FIG. 2 shows an example of a print media product with a top layer 30 with an ink-receiving side 32 and comprising round holes 31 distributed in an array on the surface of the layer, and a bottom layer 40 with an ink-receiving side 42 and comprising round holes 41 distributed in an array on the surface.

In the figure, some holes 41 and other lines of the bottom layer 40 that are concealed from view by the top layer 30 are shown in dotted lines.

In this case, the image printed on the ink-receiving side 42 of the bottom layer 40 will be made up of an array of round zones or dots.

For example, the top layer 30 may have a density of 16 holes/cm$^2$, and each hole may be 0.2 cm in diameter. With this configuration, for each cm$^2$ the area taken up by the holes is:

$$\text{Hole area}=\pi\times(0.2/2)^2\times16=0.503\ \text{cm}^2.$$

In other words, in this example the holes take up 50.3% of the surface area of the top layer, i.e. the open area of the top layer is 50.3%.

The array of ink dots that form the image on the bottom layer 40 is thus also of 16 ink dots/cm$^2$, with each ink dot having a diameter of 0.2 cm, and both printouts, on the top layer and on the bottom layer, have similar ink density and good quality.

The round holes 41 of the bottom layer 40 may also be arranged in an array of 16 holes/cm$^2$.

The two layers may be arranged with the holes 31 of the top layer and the holes 41 of the bottom layer staggered with respect to each other as shown in FIG. 2.

In this example, the holes 41 of the bottom layer 40 may have a diameter slightly smaller than that of the holes 31 of the top layer 30, in order to prevent overlap between them: the open area in the bottom layer 40 may be between 30% and 40% of the total surface area.

Since there is no overlap between the holes of the two layers, ink doesn't fall through the media product during printing, in spite that perforated layers are used; ink waste is reduced, and no liner is needed to prevent ink from falling on the print platen.

More generally, other configurations of the holes in the top and bottom layers may be foreseen that allow the two layers to be arranged in such a way that there is no overlap between their holes.

Figure 3:
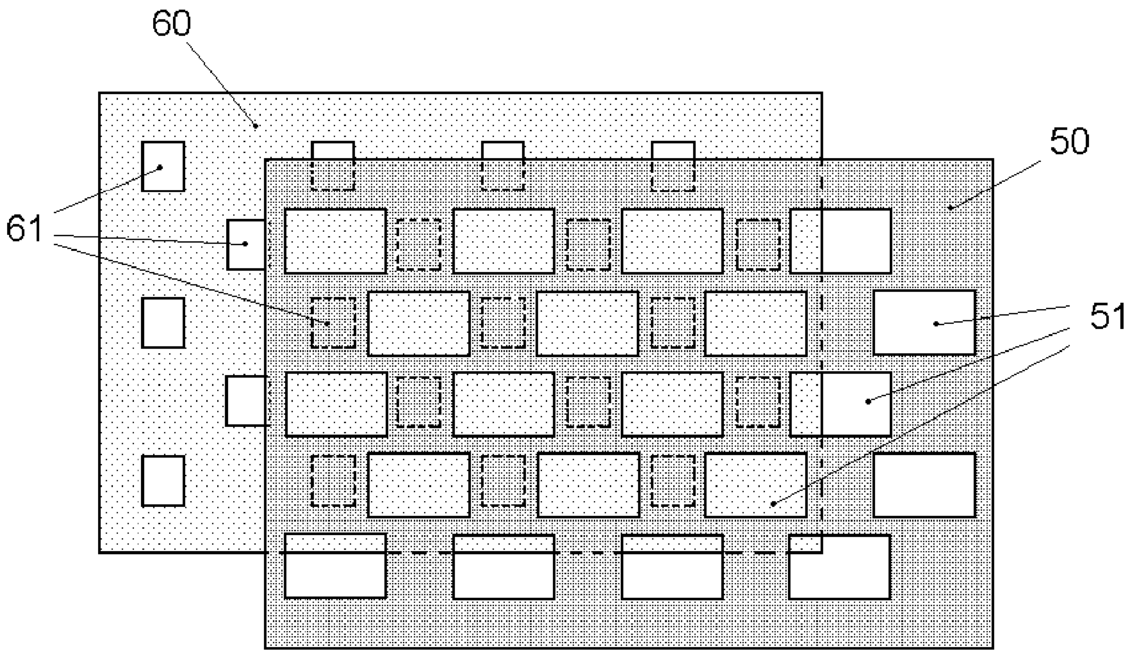
FIG. 3 shows schematically in top view a further example of an enlarged portion of a print media product comprising two layers.

FIG. 3 shows another example of print media products having a top layer 50 with openings or holes 51 and a bottom layer 60 with openings or holes 61; the geometry of the openings are different from those of FIG. 2.

The holes 51 in the top layer 50 may be rectangular in shape, and may be arranged according to parallel rows staggered with respect to each other. The holes 61 in the bottom layer 60, may also be rectangular in some examples, may be smaller than the holes 51, and may also be arranged in parallel rows staggered with respect to each other and arranged such that the two layers 50 and 60 may be attached without overlap between the holes 51 and the holes 61.

In this example the top layer 50 may have an open area, i.e. the area taken up by the holes 51, of about 48.2% of the total surface area, while the other 51.8% of the total surface area is occupied by media; the bottom layer 60 may have an open area of about 20.4% of the total surface area, while the media occupies about 79.6%.

In some examples, print media products as disclosed herein may be suitable for inkjet printing; they may also be suitable for printing with latex-based inks.

In some examples of print media products, one or both layers may comprise a film of polymeric material such as a vinyl, for example similar to HP One-view Perforated Adhesive Window Vinyl available from Hewlett Packard. Such materials for example may be employed in print media products such as those of the examples of FIGS. 2 and 3.

In other examples, either the top layer or both layers of print media products may comprise mesh materials, for example with fibres forming a mesh structure, with or without a polymeric coating.

Figure 4:
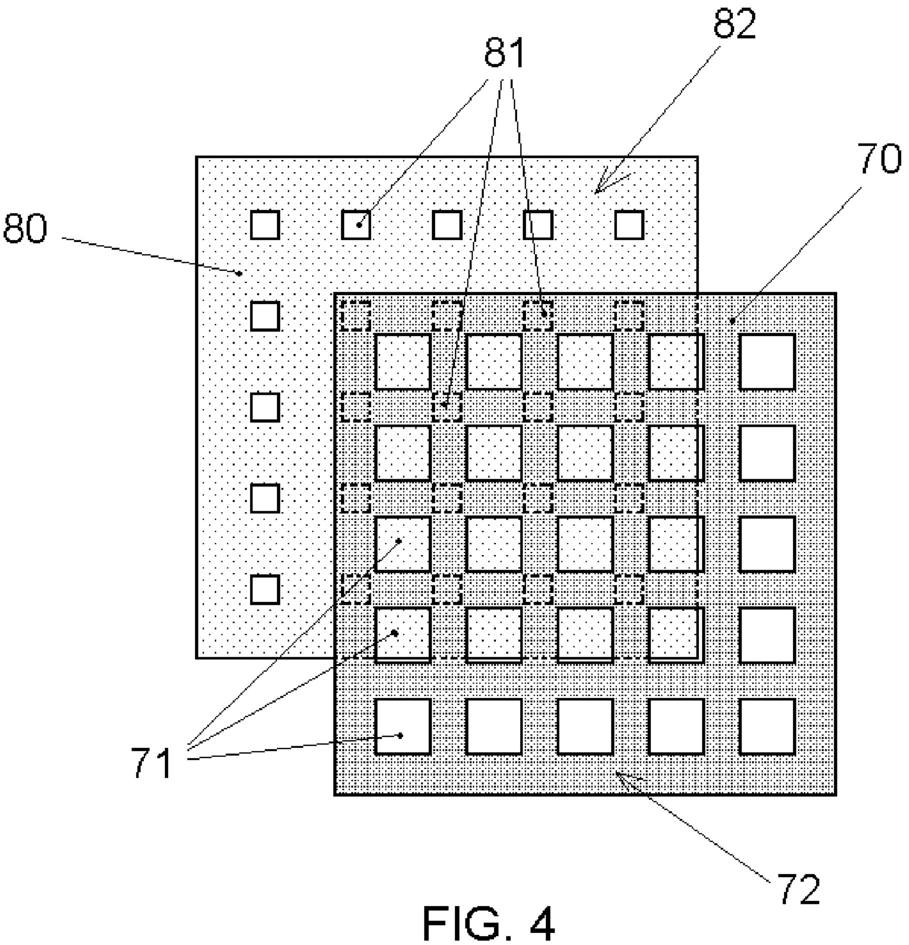
FIG. 4 shows schematically in top view still another example of an enlarged portion of a print media product having comprising two perforated layers.

FIG. 4 shows a further example of print media products, in which one or both layers may comprise mesh materials. In this figure, print media products may have a top layer 70 of mesh material comprising holes 71, for example between the different fibres forming the mesh, and a bottom layer 80, of the same or a different mesh material, with holes 81 that may be arranged such that there is no overlap between the holes 71 and 81 when the two layers are removably attached to form a print media product.

Ink receiving sides of the top layer 70 and bottom layer 80 are shown by reference numerals 72 and 82, respectively. As shown, when the two layers are removably attached ink receiving side 82 of the bottom layer may be in contact with the side of the top layer 70 that is opposite the ink-receiving side 71; when the print media product is printed by depositing ink on the top layer 70, the ink that passes through the holes 71 reaches the ink receiving side 82.

Mesh materials suitable for print media products as disclosed herein may have openings with different shapes, such as square, rectangular, slotted, etc., or even combinations of different shapes.

In some examples, print media products may have a top layer of a polymeric film, and a bottom layer of mesh material, or the other way round.

It should be noted that the proportions in the figures may not be real: for example, the thickness of the layers in FIG. 1 is exaggerated for the sake of clarity. FIGS. 2, 3 and 4 are only schematic, and for assisting understanding the top and bottom layers have been shown with their edges offset from each other; however, in practice in print media products according to the examples disclosed the edges of the two layers in general may coincide. The top layer and the bottom layer may have substantially the same size and shape.

On the other hand, such print media products may be provided in rolls.

The surfaces of the top and bottom layer have been shown in the figures with different hatchings merely in order to make the figures clearer, but each hatching is not meant to represent any particular media, or any particular surface finish, and different hatchings are not meant to represent media that are different from each other.

A printing method may comprise providing a print media product by removably attaching a top layer of a perforated printing material and a bottom layer of a perforated printing material, then printing on said print media product, and then separating the top layer from the bottom layer to obtain two printouts, one on each layer. Printing may be carried out by depositing ink on the exposed side of the top layer, such that ink falls also on the bottom layer through the holes of the top layer.

The two layers may be removably attached without overlap between the holes of the two layers.

Printing may be carried out by inkjet printing systems, and latex-based inks may be employed.

Although only a number of particular embodiments and examples have been disclosed herein, further variants and modifications of the disclosed print media products are possible; other combinations of the features of embodiments or examples described are also possible. Reference signs related to drawings and placed in parentheses in a claim, are solely for attempting to increase the intelligibility of the claim, and shall not be construed as limiting the scope of the claim. Thus, the scope of the present invention should not be limited by particular examples or embodiments, but should be determined only by a fair reading of the claims that follow.

The invention claimed is:

1. A print media product comprising a top layer of a printing material comprising a plurality of holes distributed on the surface area thereof, and a bottom layer of a printing material comprising a plurality of holes distributed on the surface area thereof, the top layer being overlayed on and removably attached to the bottom layer, such that an ink-receiving side of the top layer is exposed and an ink-receiving side of the bottom layer is in contact with the top layer, and such that the holes of the top layer are at least in part overlapped with print material of the bottom layer.

2. A print media product as claimed in claim 1, wherein the holes take up at least 45% of the surface area of the top layer.

3. A print media product as claimed in claim 2, wherein the holes take up between 48% and 60% of the surface area of the top layer.

4. A print media product as claimed in claim 1, wherein the top layer and the bottom layer are arranged such that there is no overlap between the holes of the two layers.

5. A print media product as claimed in claim 4, wherein the holes are round, and the two layers are arranged with the holes of the top layer staggered with respect to those of the bottom layer.

6. A print media product as claimed in claim 5, wherein holes in the top layer have a larger diameter than holes in the bottom layer.

7. A print media product as claimed in claim 1, wherein at least one of the top layer and bottom layer is a perforated film of polymeric material.

8. A print media product as claimed in claim 7, wherein the polymeric material is a vinyl.

9. A print media product as claimed in claim 1, wherein at least one of the top layer and the bottom layer is of mesh material.

10. A print media product as claimed in claim 9, wherein the mesh material comprises fibres forming a mesh structure and a polymeric coating.

11. A print media product as claimed in any one of the preceding claims, wherein the two layers are removably attached by means of a removable adhesive.

12. A print media product as claimed in claim 1, wherein the top layer and the bottom layer have substantially the same size and shape.

13. A printing method, comprising:

providing a print media product by removably attaching a top layer of a perforated printing material and a bottom layer of a perforated printing material;

printing on said print media product by depositing ink on the exposed side of the top layer such that ink falls also on the bottom layer through the holes of the top layer, whereby two printouts are obtained, one on each layer; and separating the top layer from the bottom layer.

14. A printing method as claimed in claim 13, wherein said print media product is printed by inkjet printing.

15. A printing method as claimed in claim 13, wherein said print media product is printed with a latex-based ink.

* * * * *